Patented Aug. 11, 1942

2,292,518

UNITED STATES PATENT OFFICE 2,292,518

COATED PAPER

John Helfrich, Westfield, N. J.

No Drawing. Application March 11, 1939,
Serial No. 261,310

1 Claim. (Cl. 117—158)

My invention relates to a new and improved coated paper.

One of the objects of my invention is to provide a coated paper which shall be either transparent or translucent or opaque, and which can be used for a number of purposes, including the packing of all products including food products, such as bread and the like.

Another object of the invention is to provide a wrapping paper, which shall have high transparency, moisture-proof and non-toxic qualities, which will have a high gloss and which will be substantially non-tacky, and which can be sealed by means of applied heat. The coating of said paper is melted under the action of heat, in order to secure said sealing. Paper of this type is known as self-sealing paper.

Another object of the invention is to provide a paper which can be coated by means of an immersion process, or by the usual coating process, for application on one or both sides of the materials. I prefer not to use solvents, because of economy and ease of operation and speed of production.

Other objects of the invention will be stated in the following description, which sets forth an improved embodiment thereof, it being understood that the above statement of the objects of my invention is intended generally to explain the same without limiting it in any manner.

While I do not wish to be limited to the preferred formula stated herein, a good working formula can be made with the use of the parts specified below, the proportions being by weight:

| | Parts |
|---|---|
| Ester gum | 62 |
| Dammar gum | 10 |
| Diamyl phthalate | 6 |
| Paraffin wax | 22 |
| Magnesium oxide | ½ |

The ingredients other than the magnesium oxide can be melted in a vessel made of suitable inert material. The temperature of the melted ingredients may be 240° F. The ingredients are gradually melted with constant stirring so as to form a uniform melt. The magnesium oxide in dry powder form is then slowly added to the melt with constant mixing so that it can react with a portion of the dammar gum to form a magnesium soap of a resin acid, said magnesium soap being insoluble in water. The magnesium oxide reacts with only a part of the dammar gum so that the final composition has some uncombined dammar gum.

The hot melted composition can be applied directly to one or both sides of the paper, without the use of any solvent, by the well known coating machine. The paper stock to which the melted composition is applied may be of any type, transparent, translucent or opaque. I prefer to coat both sides of a "glassine" paper with the melted composition. The paper stock can be coated either on one side or on both sides thereof.

The ester gum is an example of a fusible neutral resin. Instead of using this specific type of neutral resin, I can use the resin which is made by heating glycerine with phthalic anhydride, and alkyd resins of various types. The gum dammar may be replaced by other suitable gums which can react with the magnesium oxide, such as copal, sandarac gum, kauri gum, etc. The diamyl phthalate is a plasticizer and it may be replaced by numerous other well known plasticizers such as dibutyl phthalate, diethyl phthalate, dimethyl phthalate, tricresyl phosphate, and the like.

The paraffin wax is preferably the sweated crystalline type having a melting point of 145° F. (ASTM). The paraffin wax may be replaced either wholly or partially by numerous other waxes, such as beeswax, Japan wax, carnauba wax, candelilla wax, stearic wax, and the like.

The magnesium oxide can be replaced by calcium oxide and strontium oxide and the like.

Instead of the above formula, I can use a formula having 40–75 parts of the neutral resin, from 5–15 parts of the dammar gum, from 3–15 parts of diamyl phthalate, from 5–25 parts of the paraffin wax, and from ½ part to 2 parts of the magnesium oxide. The substantial disclosure of first-mentioned specific preferred formula is included in the second-mentioned second formula.

The ester gum is made by treating rosin with glycerin to form the ester. I use the neutral product in which the free acid of the rosin has been combined with the glycerin. Said neutral resin is substantially free from free acid.

The final product comprises 40–75 parts of neutral resin, 3–15 parts of diamyl phthalate, 5–25 parts of paraffin wax, and the reaction product of ½ to 2 parts of magnesium oxide and 5–15 parts of dammar gum. In specifying said reaction product, it is noted that some of the dammar gum will remain undecomposed in the composition, upon using the proportions above-mentioned.

The neutral ester gum preferably forms the major part of the composition, as can be seen from the preferred example.

The ester gum has a melting point of about 200° F. It serves as the base of the composition in order to give the coated paper suitable high gloss, improved resistance to moisture, and superior heat-sealing properties. The various ingredients are compatible with each other and in particular, the ester gum is compatible with the paraffin wax, so that a stable mixture is produced which can be repeatedly melted and resolidified without any separation of the ingredients.

Since the paraffin wax has a lower melting point than the neutral resin, said wax serves to reduce the melting point of the composition when it is used in the coating machine.

When the melted compositon is applied to the paper stock in the coating machine, the temperature of the melted compositon is preferably less than the boiling point of water. Said melted composition may be applied to the paper at a temperature of about 200° F. I do not exclude the application of the molten composition to a suitable carrier, at a temperature above 212° F.

The ingredients are combined in the total absence of water, so that the final coating composition is free from water, including occluded water.

The ingredients above mentioned are non-toxic, so that paper which has been coated with said composition can be used for wrapping bread and other food products.

The proportion of plasticizer shoudd be sufficient to give the necessary flexibility to the coating composition, so that the coated paper can be freely bent and manipulated without flaking off or cracking the coating composition.

I have designated a number of the preferred neutral resins, as there are certain neutral resins which are not compatible with the paraffin wax. If the coating composition is made with non-compatible neutral resins, said composition is not sufficiently and uniformly transparent. When "glassine" paper is coated on both sides with the preferred coating composition, the resultant product is extremely uniform and clear and transparent.

This application is a continuation in part of my application Serial No. 744,537, filed on September 18, 1934, and of my application Serial No. 178,718, filed on December 8, 1937. I have found that the para-coumarone resin which is specified in my application Serial No. 178,718 deteriorates under the action of light, so that it changes in color and it develops an odor due to oxidation. The preferred neutral resins which are stated herein, when used in combination with the other ingredients stated herein, are stable against the action of light for ordinary commercial use. However, I do not wholly exclude the use of para-coumarone resin from this invention as it is sufficiently stable for many commercial purposes. When using the preferred neutral resins specified herein the coated paper is stable, even if it is stored for a period as long as six months.

Whenever I refer to a specific substance in the claim I include the equivalents of said substance within the scope of the respective claim. The composition may include ingredients other than those specified herein.

The water-insoluble magnesium soap is formed in situ, according to the method above mentioned. It is therefore dispersed very uniformly and finely through the coating composition. The plasticizer is in sufficient proportion relative to the resin to make the composition stable, so that it can be repeatedly melted and resolidified without any separation of the ingredients. It is believed that the mutually compatible neutral resin and the wax form a solid solution, under the conditions stated herein.

I claim:

Paper having a fusible and flexible and water-impermeable and water-free coating, said coating comprising substantially 40–75 parts of a neutral resin, 3–15 parts of diamyl phthalate, 5–25 parts of paraffin wax, and the reaction product of ½ part to 2 parts of magnesium oxide and 5–15 parts of dammar gum, said proportions being by weight.

JOHN HELFRICH.